United States Patent [19]

Meadus et al.

[11] 3,967,034
[45] June 29, 1976

[54] PRESSURE SENSITIVE COATINGS
[75] Inventors: Frederick Weldon Meadus; Bryan David Sparks; Ira Edwin Puddington, all of Ottawa, Canada
[73] Assignee: Canadian Patents and Development Limited, Ottawa, Canada
[22] Filed: Dec. 20, 1972
[21] Appl. No.: 316,726

[30] Foreign Application Priority Data
Dec. 22, 1971 Canada ................ 130879

[52] U.S. Cl. ........................ 428/323; 260/17.5; 260/18 R; 260/21; 260/23 R; 428/484
[51] Int. Cl.² .................. C08L 29/04; C08L 31/04; C08L 39/06; C08L 91/00
[58] Field of Search ................ 260/23 R, 18 R, 21, 260/17.5; 117/35.6, 36.7; 428/146, 488, 500, 323, 484; 106/19, 191, 272

[56] References Cited
UNITED STATES PATENTS

| | | | |
|---|---|---|---|
| 1,830,980 | 11/1931 | Carr | 260/23 R |
| 2,313,808 | 3/1943 | Dalton | 282/28 |
| 2,313,810 | 3/1943 | Dalton | 282/28 |
| 2,404,519 | 7/1946 | Morrison et al. | 260/28 |
| 3,108,009 | 10/1963 | Clancy et al. | 117/46 |
| 3,446,646 | 5/1969 | Terry | 117/35.6 |
| 3,540,580 | 11/1970 | Columbus et al. | 206/63.2 |
| 3,619,157 | 11/1971 | Brinckman | 96/27 |
| 3,669,728 | 6/1972 | Seiner | 117/161 VA |

*Primary Examiner*—Donald E. Czaja
*Assistant Examiner*—E. A. Nielsen

[57] ABSTRACT

A composition for forming pressure- and heat-sensitive coating comprising finely divided organic material of particle size from about 0.001 to 15 micrometers in diameter having a melting point above about 55°C, the particles being of substantially uniform color and subject to plastic flow by heat or pressure, a liquid carrier in sufficient amount to give a fluid system and normally including a binder dispersed in the carrier. The composition optionally includes an oil-soluble dye or a pigment uniformly dispersed in said particles. A method for preparing the compositions which comprises heating to dissolve in a suitable solvent as the solid organic material, cooling the resulting solution to form a paste of the desired particles, normally incorporating a binder, and optionally incorporating coloring material into the organic material.

28 Claims, 2 Drawing Figures

PRESSURE SENSITIVE COATINGS

BACKGROUND OF THE INVENTION

1. Field of the Invention

The present invention relates to coating compositions, pressure-sensitive and heat-sensitive coatings and a process for preparing same.

Present pressure-sensitive copying systems are primarily of two types. One such system, which is typified by ordinary carbon paper, provides a mark under pressure by transfer at the areas of pressure of a complete mass of coating containing carbon black or other pigment. This waxy mixture is relatively soft and of low tensile strength and is, therefore, not resistant to scuff or offset. The mark obtained on the copy sheet is also prone to smudge and offset onto hands and clothing.

A second type of pressure sensitive copying system employs, on one side of a sheet, a continuous coating containing marking fluid inclusions. In accordance with this system, the paper of a record material is coated on one surface with a continuous film containing minute droplets of an oily marking fluid. In this type of copying sheet, the marking fluid may be coloured or it may be colourless but capable of forming a colour by a chemical reaction with another chemical upon being brought into contact with each other. Under the pressure of writing or typing, the coating ruptures and the droplets of marking fluid exude on to the copy sheet to make a mark by direct coloration or colour transfer or by forming a colour by chemical reaction with a coreacting chemical on the adjacent surface of the copy sheet. The difficulty with products of this type is that the surface of the coated sheet is susceptible to scuffing, abrasion and incidental rubbing which unavoidably causes rupture of the film, release of the marking fluid, and consequently smudge or offset or both. Also, on storage of the sheets, the coating material tends to dry out and crack, particularly when bended or folded, thus releasing the marking fluid through the resulting cracks to smudge or offset an adjacent copy sheet or the hands or clothing. In the case of such coatings containing a colourless marking fluid, this difficulty arises only when the ruptured film is on contact with a copy sheet or other source of the coreacting chemical. But this is a very real disadvantage since such copying materials are not only used, but usually stored in this condition.

2. Description of the Prior Art

In the past, for example, according to Canadian Pat. No. 627,609 to Schossberger et al, pressure-sensitive particles having a dark core and a frangible light-coloured pigment covering are described. Under pressure the covering breaks and the dark core is exposed. Moreover, the pigments contained in the covering as described in this patent are limited to light-coloured pigments, for example titanium dioxide.

SUMMARY OF THE INVENTION

It is accordingly an object of the invention to provide a solid phase coating which avoids many of the aforementioned objections.

Further objects and advantages of the invention will be set forth in part in the following specification and in part will be obvious therefrom without being specifically referred to, the same being realized and attained as pointed out in the claims hereof.

With the above and other objects of the invention in view the particles of the coating of the present invention contain no hard core or covering (and no liquid), and the development of contrast does not depend on the rupturing of a thin skin, but on the flowing together, compacting and smoothening of the coating layer. Moreover, the particles of the novel coating do not simply crush, but compact and tend to flow together when pressure or heat is applied. Additionally, when colouring material is incorporated into the coating, the particles of the novel pressure-sensitive coating have the pigment or dye distributed evenly throughout, not one pigment in the covering layer and another in the hard core as taught by the aforementioned patent. Also, the present invention contemplates using a broader range of colours including the range from yellow to black.

According to the present invention, a pressure-sensitive and heat-sensitive coating is provided, having a compactable porous structure including fine, discrete, stable, light-reflecting particles of a solid organic material melting above about 55°C. The particles are in the lightscattering range of about 0.001 to 50 microns in diameter. The applied coating has a smooth surface and adheres to paper or other suitable substrate materials. The coated material is handleable without marking, and shows characters when subjected to pressure, for example, by a credit card.

DESCRIPTION OF THE INVENTION

Figure 1:
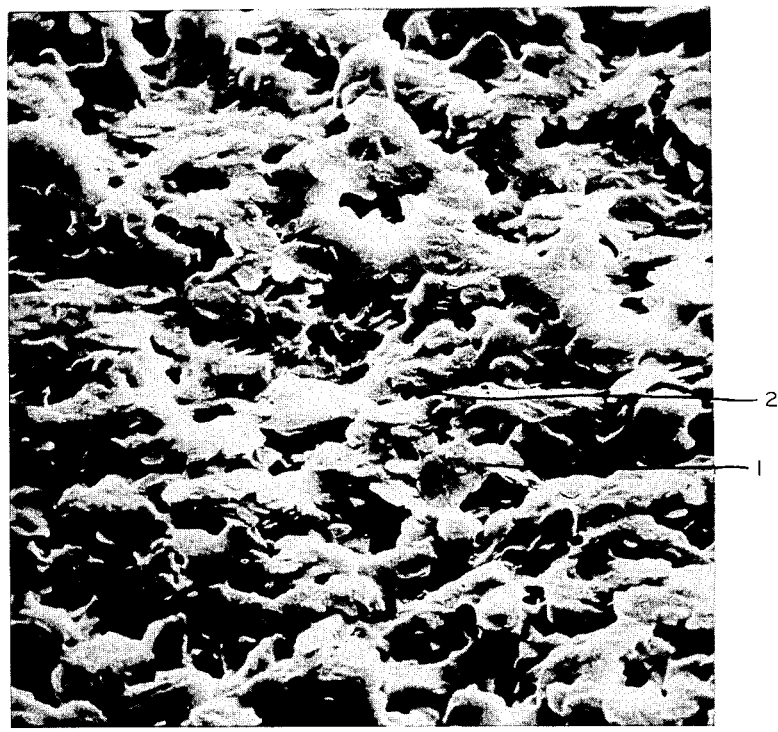
FIG. 1 is a section from an electron scanning photo micro-graph illustrating a portion of a pressure-sensitive stearic acid coating before printing, taken at a magnification of 2,000.

More specifically, a pressure-sensitive coating composition is provided containing pressure-sensitive and heat-sensitive particles of a solid organic material having a melting point above about 55°C which forms fine discreet stable particles of substantially neutral or light-coloured appearance upon crystallization or comminution, the particles being plastic and meldable upon the application of pressure or heat. High melting point fatty acids and fatty alcohols $C_{16}$ and above are preferred, although any plastic or crystalline organic material that can be precipitated or formed into particles of the required size range, of the order of 0.001 to 50 micrometers, preferably less than 5 micrometers, should give similar results. For example stearic acid, 12-hydroxy-stearic acid, a mixture of various hydroxy-stearic acids, behenic acid, palmitic acid and 1-octadecanol have been found very suitable. A finely divided lignin also gave adequate results.

A suitable liquid carrier is provided in sufficient amount to give a fluid system, for example, water or an organic liquid such as methanol, ethanol, nitromethane, acetone, and mixtures thereof, in some cases mixed with "Varsol" (trademark for liquid aliphatic hydrocarbon mixture), petroleum ether, chloroform, or water; for example, ethanol and water. The liquid carrier is conveniently a solvent for the organic material at elevated temperatures and is used initially for crystallization. However, it may remain upon cooling as part of the final coating composition becoming substantially non-solvent. The solvent can be evaporated at least in part and a different liquid carrier which is a non-solvent for the organic material may be used for the final coating composition. The carrier is evaporated upon final application to the substrate.

The composition may also contain an oil-soluble dye, a pigment or a mixture thereof to provide coatings of various colours including the range from yellow to grey, for example, sudan black, waxoline green, Dupont oil black, Dupont oil orange and sudan III; pigments, for example, lignin, carbon black, ferric oxide and cerric oxide or a mixture of dye and pigment, for example, sudan black plus lignin.

The composition normally further contains a binder for example, Bondfast (trademark for an emulsion of polyvinyl-acetate), polyvinyl acetate, polyvinyl alcohol, polyvinyl-pyrrolidone, Fuller's H.B. adhesive (trademark for a mixture of partially hydrolyzed polyvinyl acetate), urea-formaldehyde adhesives, Uformite 700 (trademark for a 30% solution of urea-formaldehyde) and mixtures thereof. The binder should be compatible with and highly dispersed in the liquid carrier.

Minor amounts of soft filler particles may be included to dilute the bulk of the pressure-sensitive, heat-sensitive particles if desired. Inexpensive compactable filler particles which may be used include finely divided soft lignin, aerogel silicas, very small plastic microballoons etc.

The novel pressure-sensitive coatings may be prepared according to the following method. The solid organic material, for example, stearic acid was dissolved in a heated solvent such as ethanol, acetone or a mixed solvent of ethanol and water. Crystals were formed by quickly cooling the solution or by adding a second non-solvent liquid such as water, in sufficient amount to precipitate stearic acid crystals. High speed stirring was carried out during this operation and a gel structure usually resulted. The cooling was accomplished by adding liquid nitrogen to the solution, or by cooling some solvent and adding it to the solution-any form of fast cooling would do. Alternatively, a pressure-sensitive coating can be prepared by application of such a hot mixture containing the dissolved solids directly to the substrate with subsequent cooling to produce the desired particles in situ in the coating. Sufficient solvent is required to dissolve the stearic acid, but additional amounts of liquid can be added depending upon the consistency of the paste required for the printing operation.

Any oil-soluble dye or a pigment such as previously mentioned may be incorporated into the paste. For best dispersion of dyes, it is preferred that they be dissolved in the organic material e.g. in melted stearic acid before the organic solids are dissolved in the solvent for particle formation. This is not essential, and pigments can be mixed in after the particles or crystals have been formed. For the preparation of a dry powder suitable for subsequent incorporation into a liquid carrier the solvent is then removed, at least in part e.g. with a vacuum pump. A very porous structure is produced which easily breaks up into a powder upon mixing in a coffee-type grinding mill. The powder is then added to the binder, for example, Bondfast, and water or another suitable liquid carrier is mixed in to make a smooth paste and the mixture applied to paper to give, upon drying, a pressure-sensitive coating which has excellent contrast when pressure or heat printed. Alternatively Gelva (trademark for polyvinylacetate) dissolved in nitromethane can be added to the powder to give a coating composition which gives good pressure-sensitive and heat-sensitive qualities and which dries more quickly than water and alcohol.

Alternatively, the solvent used for particle formation can be retained. The binder is then added to the mixtures of the solid organic particles, solvent and colouring material resulting in a smooth paste, which when applied to the substrate, and dried produces a pressure-sensitive coating having excellent contrast when pressure printed.

Binder content should be minimized, consistent with good adhesion, as it can interfere with the porous structure and printing characteristics of the coating. A range of about 5 to 100% by weight of binder, based on the weight of the solid organic material has been found acceptable.

The paste was applied to the paper using a film spreader, but coating by such methods as air knife coating, silk screening, doctor blade, template, or roller coating are contemplated. To improve contrast, the final dried surface can be washed with a dilute base such as $NH_4OH$, $NaOH$, $KOH$, etc., giving the surface a whiter appearance. Contrast can also be improved by adding small amounts of blush-producing agents such as petroleum solvents to the final paste as is known in paint technology.

This invention requires the production of a porous coating of particles or crystals containing a great many voids. The crystals and voids should be from 0.001 micrometers to 50 micrometers diameter, with the most desired size being <5 micrometers. The voids preferably are less than about one-half the size of the particles. Both the particles and the voids should contribute to maximize the light-scattering effect. Particles of from 0.001 micrometers to 50 micrometers would give a significant light-scattering effect with the most prominent effect being obtained from particles and voids of about 1 to 6 micrometers. A soft binder acts to bind these particles to the paper or any other suitable substrate. Under pressure, as in a credit card application, the bonded porous layer must compact to give a smooth surface. A collapsible porous structure in the layer is desirable to improve the optical contrast on plastic flow of the solid particles during printing.

A feature of the present invention is the application of a heated coating composition with the solid organic material substantially dissolved therein, to a cool substrate causing rapid cooling and formation of particles or crystals and evaporation of the solvent (carrier), leaving a porous layer of good pressure- and heat-sensitivity.

This invention is not necessarily restricted to fatty acids. Any organic material that can be precipitated or formed into the required particle size range and which will flow under heat or pressure should give similar results. For example, a finely divided dry lignin formed by precipitation was mixed with a water-based adhesive (H. B. Fuller) and spread on paper. When dry, this material exhibited printing characteristics similar to those of the stearic acid coatings. It was noted that coatings of such lignins (mpt 200°–220°C) were less pressure-sensitive and heat-sensitive (though useful) than stearic acid coatings (mpt 69°C).

DESCRIPTION OF THE PREFERRED EMBODIMENTS

Figure 2:
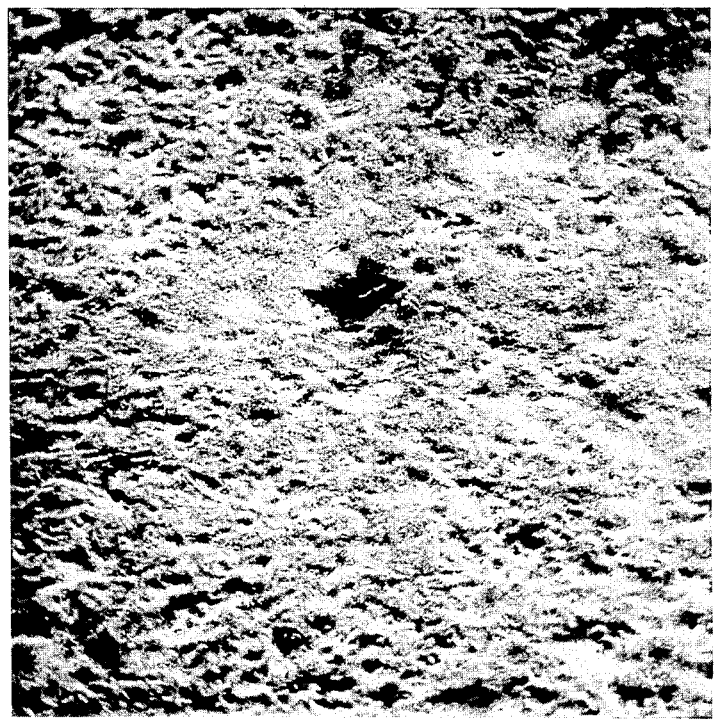
FIG. 2 is a section of a pressure-sensitive stearic acid coating after printing, taken at a magnification of 2,000.

Referring to FIG. 1, the crystals 1 and the voids 2 are clearly visible in the unprinted area. If we then look at FIG. 2, it is apparent that the crystals 1 and the voids 2 cannot be distinguished. Examination of the coating, using electron scanning microscopy, together with X-ray diffraction has shown that the surface of the unprinted area is very porous and very crystalline. The crystals appear to be platelets of stearic acid. The coating structure as seen in FIG. 1 is very porous and contains a large number of voids which are smaller than the individual stearic acid crystals. This coating scatters light and appears much lighter in colour than it really is. When pressure is applied as in a printing operation the surface structure is smoother and no light is scattered from the imprinted characters as illustrated in FIG. 2.

Since heat alone, in excess of the melting or flow point of the composition, has been observed to produce a similar effect to pressure, it suggests that pressure causes plastic flow of the coating in the areas where the pressure is applied. This demonstrates the feasibility of utilising enhanced plasticity at higher temperatures by using a hot printing process without even actual pressure contact. A further feature of the invention is the printing or developing contrast by directed heat (without pressure) utilizing means such as electrical discharge, focused infrared and microwave radiation.

For testing purposes, the gel or paste coating composition was spread over a surface with a spatula or film spreader, allowed to dry and visually rated for adhesion to paper, surface smoothness, and contrast on printing with a credit card. The thickness of the coating was easily controlled using a film spreader and excellent smooth surfaces were obtained.

Good smooth surfaces were also obtained if a template was used with a knife edge being drawn over the template. Similarly good surfaces were obtained when the coating composition was extruded through a long narrow orifice onto paper. Sudan Black dye was used in these Examples but similar results have been obtained with other dyes and pigments. The results are tabulated in the following examples:

EXAMPLE 1

100 g of stearic acid +0.8 g of Sudan Black oil-soluble dye were heated to melt the stearic acid and dissolve the dye. This mix was then added to 200 ml of hot ethanol (95% in a high speed blender. 200 ml of additional ethanol which had been cooled to its freezing point with liquid nitrogen was added and a gel structure formed. To this gel material was added 130 g of commercial "Bondfast" (an emulsion of polyvinylacetate) and 50 ml of water. The whole operation was conducted with high speed stirring in a commercial blender. The resulting paste could be coated readily and after drying and printing with light pressure good contrast was observed.

EXAMPLE 2

0.4 g. Sudan Black was dissolved in 50 g melted stearic acid. This was added to 100 ml hot ethanol (at boiling point). While stirring in a Waring blender, liquid nitrogen was added to produce a gel structure. 70 g of Bondfast was added and thoroughly mixed. When the resulting paste was spread on paper to give, on drying, a porous pressure-sensitive coating, and the coating printed with light pressure, good contrast was observed. The printed area always appears much darker.

EXAMPLE 3

0.4 g sudan black was dissolved in 50 g melted stearic acid. This was added to 100 ml of hot ethanol (at boiling point). While stirring in a Waring blender, water was added to precipitate the stearic acid and a gel structure formed. 80 g of Bondfast was added and thoroughly mixed. The resulting paste, when spread on paper, gave a porous pressure-sensitive coating on drying.

EXAMPLE 4

0.8 g sudan black was dissolved in 100 g melted stearic acid. This was added to 400 ml of hot acetone (at boiling point). Liquid nitrogen was added to precipitate the stearic acid. 85 g of Bondfast was added with mixing. The resulting paste when applied to paper gave a porous pressure-sensitive coating on drying with good contrast on printing. The addition of 25 ml water improved the spreadability of the paste.

EXAMPLE 5

0.8 g sudan black was dissolved in 100 g hot stearic acid. This mix was added to 100 ml hot 95% ethanol (at boiling point) in a Waring blender. 100 ml 95% ethanol cooled to the freezing point was added and mixed resulting in the formation of a gel-type structure. It was then vacuum dried. The dried material consisting of clusters of fine particles was broken up in a coffee-type grinder mill and fine fluffy powder formed.

a. 10 g above powder + 6 g Bondfast + 26 ml water + 1 g lignin powder were mixed and when applied to paper gave an excellent pressure-sensitive coating on drying.

b. 10 g of the above powder + 6 g Bondfast + 26 ml nitromethane were mixed and when applied to paper gave a good pressure-sensitive coating on drying.

c. 10 g of the above powder + 8 ml "Uformite 700" (30% solution, urea-formaldehyde, Rohm and Haas) were mixed with 25 ml water and when applied to paper gave a good pressure-sensitive coating on drying.

EXAMPLE 6

100 g stearic acid were dissolved in 200 ml hot 95% ethanol (at boiling point). This solution was added to 50 ml water in 150 ml 95% ethanol which had been cooled to the freezing point. Upon stirring in a Waring blender, a gel structure formed. 80 ml Bondfast and 1 g carbon black were added with mixing. When the paste was applied to paper, a good pressure-sensitive coating resulted on drying.

EXAMPLE 7

0.3 g of sudan black dye was dissolved in 50 g of melted palmitic acid. 100 ml of boiling 95% ethanol was then added. This system was mixed in a Waring blender with 80 g of Bondfast and sufficient cold water to form a gel paste. When applied to paper, and allowed to dry, this gave a good pressure-sensitive coating.

EXAMPLE 8

As in Example 7 but using a mixture of various hydroxystearic acids instead of palmitic acid. This mixture resulted in a very satisfactory pressure-sensitive coating which gave the best contrast observed.

EXAMPLE 9

As in Example 7 but using 12-hydroxystearic acid instead of palmitic acid. This system resulted in a very satisfactory pressure-sensitive coating.

EXAMPLE 10

As in Example 7 but using 1-octadecanol instead of palmitic acid. A very satisfactory pressure-sensitive coating resulted.

EXAMPLE 11

50 g 1-Octadecanol + 0.1 g Sudan black dye + 100 ml 95% ethanol were heated to 90°C. 40 g of Bondfast was added and heated with mixing, to dissolve. This hot liquid was spread onto paper where crystals immediately formed giving a pressure-sensitive coating. Good contrast was observed on printing.

EXAMPLE 12

Lignin powder was prepared from Kraft spruce black liquor (supplied by Domtar) by acidification with $CO_2$ and then precipitation by addition of $H_2SO_4$ to pH4 at 85°C. The precipitate was washed with water and filtered, to give a wet material containing 43% solids.

| | |
|---|---|
| 10 g | wet lignin paste (43% solids) |
| 4.5 mls | Fuller's H.B. adhesive |
| 3 mls | water |

These ingredients were mixed by hand and spread on paper to give a film thickness of 0.003 inches after air drying at 90°C. The dried coating was pressure-sensitive.

EXAMPLE 13

Lignin powder was prepared from Indulin AT (dry lignin supplied by WestVaco Chemical Products). Indulin AT was suspended in water to remove water-soluble or -dispersible materials, then filtered, dissolved with alkali and precipitated with HCl to pH3 at 92°C. The lignin suspension was filtered hot, washed and air dried.

| | |
|---|---|
| 5 g | dry lignin powder |
| 4 g | Bondfast |
| 15 mls | water |

These ingredients were mixed by hand and spread on paper to give a pressure-sensitive coating 0.004 inches thick after air drying at room temperature.

EXAMPLE 14

| | |
|---|---|
| 5 g | dry lignin powder from Ex. 13 |
| 5 mls | Fuller's HB adhesive |
| 10 mls | water |

These ingredients were mixed by hand and spread on paper. After air drying at room temperature a pressure-sensitive coating 0.004 inches thick was obtained. This preparation gave the best contrast of the lignin Examples.

EXAMPLE 15

20 g 1-Octadecanol + 0.1 g Sudan Black dye were heated to dissolve the dye and then added to 16 g of Bondfast which had been dissolved in 50 ml of hot methanol. This system was cooled rapidly with mixing. Water and methanol were added to give a smooth paste. When spread onto paper and allowed to dry, this paste gave a coating which was pressure-sensitive and heat-sensitive.

EXAMPLE 16

8 g Gelva V15 (Polyvinyl acetate) was dissolved in 40 ml of hot methanol and added to 20 g of melted 1-octadecanol containing 0.2 g of Sudan black dye. This hot melt when spread on paper to cool and dry formed crystals in the coating which were pressure-sensitive and heat-sensitive.

EXAMPLE 17

A significant benefit or synergistic effect has been found using a mixture of stearic acid and hydroxystearic acid. Different proportions of the two acids have been mixed and optimum benefit in terms of contrast on printing observed at about 35–50% by wt. of stearic acid (based on total fatty acid). The following is one preferred formulation which gave excellent contrast, adhesion and overall appearance when applied to stiff paper as a hot solution using a continuous film spreader.

| | |
|---|---|
| Stearic acid | 180 g (43%) |
| Hydroxystearic acid | 248 g |
| Sudan III | 2 g |
| Ethanol (95%) | 850 ml |
| Water | 350 ml |
| PVA Emulsion (Bondfast) | 530 g |

When this formulation was compared with the same formulation containing stearic acid alone or hydroxystearic acid alone at the same fatty acid concentration, the contrast on printing was visually rated as good (stearic acid), very good (hydroxystearic acid), and excellent (best) for the mixture.

What we claims is:

1. A composition, which on drying on a substrate forms a pressure- and heat sensitive coating comprising (a) meldable organic particles consisting of a mixture of stearic acid and hydroxystearic acid of about 0.001 to 50 micrometers in diameter, said particles being formed by precipitation from a solvent and having a melting point above about 55°C, the particles being of substantially uniform colour, that will provide a visible change from a light to a darker colour, when subjected to plastic flow or deformation by heat or pressure, (b) a liquid carrier, being a poor solvent for the organic particles at least at room temperature, in sufficient amount to give a fluid system, and (c) a binder, dispersed or dissolved in the carrier to provide adhesion for the organic particles to a substrate without decreasing the pressure or heat deformability of the organic particles.

2. The composition of claim 1 wherein an oil-soluble dye or a pigment is uniformly dispersed in said particles.

3. The composition of claim 1 wherein the particle size is less than about 6 micrometers.

4. The composition of claim 1 wherein the carrier is an organic liquid, water or compatible mixtures thereof.

5. The composition of claim 4 wherein the carrier is selected from methanol, ethanol, nitromethane, acetone, water and mixtures thereof.

6. The composition of claim 1 wherein the binder is present in from about 5 to 100% by weight of the organic material.

7. The composition of claim 6 wherein the binder is selected from polyvinylacetate adhesives, polyvinylalcohol, polyvinylpyrrolidone, ureaformaldehyde adhesives and mixtures thereof.

8. A pressure- and heat-sensitive coating or layer having a highly compactable open porous continuous matrix structure of contiguous fine light scattering meldable organic plate-like particles and fine light scattering open pores, the particles consisting essentially of a material selected from fatty acids, fatty alcohols, and mixtures thereof of about 0.001 to 50 micrometers in diameter, obtained by precipitation from a solvent and having a melting point above about 55°C, the particles being of substantially uniform colour, that will provide a visible change from a light to a darker colour, when subjected to plastic flow or deformation by heat or pressure and a binder to provide adhesion for the organic particles to a substrate without decreasing the pressure or heat deformability of the organic particles.

9. The coating of claim 8 on a sheet or film substrate.

10. A method for preparing compositions for forming pressure- and heat-sensitive coatings which comprises: heating to dissolve in a suitable solvent meldable organic particles consisting essentially of a material selected from fatty acids, fatty alcohols, and mixtures thereof having a melting point above about 55°C cooling the solution to form a paste of the desired particles of about 0.001 to 50 micrometers in diameter, and being of substantially uniform colour, to provide a visible change from a light to a darker colour, when subjected to plastic flow or deformation by heat or pressure, and incorporating a binder into the solution or paste before application to a substrate.

11. A method of claim 10 including the further steps of a) removing the original solvent, at least in part from the initial paste, b) breaking up clusters of fine particles, c) reconstituting as a paste using a separate nonsolvent liquid carrier and d) finally incorporating the binder.

12. The method of claim 10 including incorporating colouring material into the organic material.

13. The method of claim 10 wherein the cooling and particle formation take place on a substrate during a coating operation.

14. The coating or layer of claim 8 wherein said particles consist essentially of a fatty acid of at least 18 carbon atoms.

15. The coating or layer of claim 8 wherein said particles consist essentially of stearic acid.

16. The composition of claim 1 wherein said binder comprises polyvinyl acetate.

17. The composition of claim 16 wherein said particles consist essentially of stearic acid.

18. The coating or layer of claim 8 wherein said particles consist essentially of 1-octadecanol.

19. A method for preparing, in situ pressure- and heat-sensitive coatings which comprises (a) heating to dissolve in a liquid carrier, comprising at least two miscible liquids at least one of which is more volatile than the other or others, meldable organic particles consisting essentially of a material selected from fatty acids, fatty alcohols and mixtures thereof having a melting point above about 55°C, (b) incorporating a binder into the solution in an amount not more than said meldable organic particles (c) cooling to precipitate the organic particles not later than upon application to a substrate (d) removing a more volatile part of the carrier and (e) subsequently removing the remaining carrier.

20. The method of claim 18 wherein the miscible liquids are chosen such that the meldable organic particles are soluble in the mixture, but poorly soluble in the individual solvents, at least at room temperature.

21. The method of claim 16 wherein the liquid carrier comprises solvents chosen from the group consisting of organic liquids and water.

22. The method of claim 16 wherein the liquid carrier comprises solvents chosen from the group consisting of methanol, ethanol, nitromethane, acetone and water.

23. The method of claim 16 wherein the liquid carrier comprises ethanol and water.

24. The method of claim 19 wherein the cooling is effected by, in step (c), applying the solution to a cool substrate.

25. The method of claim 19 comprising the additional step of uniformly dispersing an oil-soluble dye or a pigment in the solution.

26. The method of claim 19 wherein the binder is present in an amount of from about 5 to 100% by weight of the organic material.

27. The method of claim 19 wherein the binder is selected from polyvinylacetate adhesives, polyvinylalcohol, polyvinylpyrrolidone, urea-formaldehyde adhesives and mixtures thereof.

28. A pressure- and heat-sensitive coating or layer having a highly compactable open porous continuous matrix structure of contiguous fine light-scattering meldable organic particles and find light-scattering open pores, the particles consisting of precipitated lignin of about 0.001 to 50 micrometers in diameter, having a melting point above about 55°C, the particles being of substantially uniform colour, that will provide a change from a light to a darker colour, when subjected to plastic flow or deformation by heat or pressure, and a binder to provide adhesion for the lignin particles to a substrate without decreasing the pressure or heat deformability of the particles.

* * * * *